(12) United States Patent
Shah

(10) Patent No.: US 7,716,466 B2
(45) Date of Patent: May 11, 2010

(54) USER SELECTABLE CONFIGURATION OPTIONS APPLICATION FOR INACCESSIBLE NONVOLATILE STORAGE AT BOOTSTRAP

(75) Inventor: Mehul M. Shah, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 491 days.

(21) Appl. No.: 11/765,952

(22) Filed: Jun. 20, 2007

(65) Prior Publication Data

US 2008/0320294 A1    Dec. 25, 2008

(51) Int. Cl.
*G06F 15/177* (2006.01)
(52) U.S. Cl. .................. 713/2; 713/1; 713/100
(58) Field of Classification Search .......... 713/1, 713/2, 100
See application file for complete search history.

(56) References Cited

U.S. PATENT DOCUMENTS

| | | | |
|---|---|---|---|
| 5,748,980 A * | 5/1998 | Lipe et al. ................. | 710/8 |
| 6,289,459 B1 | 9/2001 | Fischer et al. | |
| 7,500,090 B2 * | 3/2009 | Mondshine et al. ......... | 713/1 |
| 7,594,144 B2 * | 9/2009 | Brandyberry et al. ....... | 714/43 |
| 2005/0144434 A1 | 6/2005 | Taylor et al. | |
| 2007/0074063 A1 * | 3/2007 | Mondshine et al. ......... | 714/4 |
| 2008/0126852 A1 * | 5/2008 | Brandyberry et al. ....... | 714/8 |

OTHER PUBLICATIONS

Gardner, J. Scott; ExtremeTech Build It, Tweak It, Know It, iGO The Only Charge you Need. Simply Switch the Tip; PC Motherboard Technology; Jun. 12, 2001.

* cited by examiner

*Primary Examiner*—Dennis M Butler
(74) *Attorney, Agent, or Firm*—Cynthia G. Seal, Esq.; Steven M. Greenberg, Esq.; Carey, Rodriguez, Greenberg & Paul, LLP

(57) ABSTRACT

Embodiments of the present invention address deficiencies of the art in respect to applying user configurable options during bootstrap and provide a novel and non-obvious method, system and computer program product for user selectable configuration options application for inaccessible nonvolatile storage at bootstrap. In one embodiment of the invention, a method for user selectable configuration options application for inaccessible nonvolatile storage at bootstrap can be provided. The method can include powering up a motherboard for a computer system and reading user selectable configuration options for the computing system from sticky bits prior to bootstrap for the motherboard. The method further can include applying the user selectable configuration options to the computing system. Finally, the method can include performing bootstrap for the motherboard subsequent to applying the user selectable configuration options.

11 Claims, 2 Drawing Sheets

USER SELECTABLE CONFIGURATION OPTIONS APPLICATION FOR INACCESSIBLE NONVOLATILE STORAGE AT BOOTSTRAP

BACKGROUND OF THE INVENTION

1. Field of the Invention

The present invention relates to the field of computer motherboard organization and more particularly to applying user selectable configuration settings during bootstrap.

2. Description of the Related Art

The computer has evolved over time from a massive collection of electronic and electrical components to a tightly integrated marvel of technology packaged within the smallest imaginable confines. The computer generally includes a motherboard hosting multiple integrated circuit chips. The motherboard chipset for a computer generally includes a central processing unit (CPU), dynamic and non-volatile memory, and one or more peripheral devices. Modern motherboard designs incorporate both a north bridge chipset and a south bridge chipset. The north bridge chipset is responsible for controlling data transmission among the CPU, dynamic memory and a video display. The south bridge chipset, by comparison, manages communications between the CPU and the peripheral devices.

Exemplary peripheral devices include legacy bus technologies such as a peripheral component interconnect (PCI) slots and industry standard architecture (ISA) slots, fixed drive drives, universal serial bus (USB) controllers, local area network controllers, fire-wire controllers and the like. The latter require relatively high transmission speeds and enjoy near direct access to non-volatile memory, while the former peripheral devices do not require high transmission speed to transmit the data and store data through an input/output (I/O) chipset. Notably, the south bridge chipset manages access to the basic input output system (BIOS) utilized during bootstrap to initialize the operational functionality of the underlying computer.

In modern computing systems, non-volatile memories like FLASH memory containing the boot code of the BIOS are increasingly supported by the north bridge chipset rather than the south bridge chip set. In consequence, the basic functionality for the computing system can be enabled immediately after power on reset of the motherboard before establishing a communicative path from the CPU to the south bridge. Thus, the CPU can execute the boot code in the BIOS through the north bridge chipset and, as a result, the computing system can be configured at an earlier stage of bootstrap. Still, user configurable options associated with the BIOS remain in battery backed up non-volatile storage managed by the south bridge. Thus, user configurable options cannot be applied during bootstrap until a communicative path has been established between the CPU and the south bridge chip set.

BRIEF SUMMARY OF THE INVENTION

Embodiments of the present invention address deficiencies of the art in respect to applying user configurable options during bootstrap and provide a novel and non-obvious method, system and computer program product for user selectable configuration options application for inaccessible nonvolatile storage at bootstrap. In one embodiment of the invention, a method for user selectable configuration options application for inaccessible nonvolatile storage at bootstrap can be provided. The method can include powering up a motherboard for a computer system and reading user selectable configuration options for the computing system from sticky bits prior to bootstrap for the motherboard. In this regard, sticky bits are bits stored in memory that are preserved during system reset, but that are not preserved during power cycle. The method further can include applying the user selectable configuration options to the computing system. Finally, the method can include performing bootstrap for the motherboard subsequent to applying the user selectable configuration options.

In one aspect of the embodiment, the method also can include copying user selectable configuration options from non-volatile memory for a BIOS for the motherboard into the sticky bits subsequent to bootstrap. In another aspect of the embodiment, copying user selectable configuration options from non-volatile memory for a BIOS for the motherboard into the sticky bits subsequent to bootstrap can include comparing the user selectable configuration options reflected by the sticky bits to the user selectable configuration options of the non-volatile memory and copying user selectable configuration options from the non-volatile memory into the sticky bits subsequent to bootstrap only if differences are detected between the user selectable configuration options.

In another embodiment of the invention, a motherboard can be provided. The motherboard can include a north bridge configured for coupling to a south bridge across a peripheral bus. Each of the north bridge and south bridge further can be configured for coupling to a CPU and a BIOS coupled to the south bridge. The BIOS further can be coupled to non-volatile storage storing user selectable configuration options. The motherboard also can include advance configuration logic disposed in firmware coupled to each of the north bridge and the sticky bits. The logic can include program code enabled to apply to the motherboard prior to bootstrap user selectable configuration options reflected by the sticky bits in lieu of user selectable configuration options stored in the non-volatile storage.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for user selectable configuration options application for inaccessible nonvolatile storage at bootstrap. In accordance with an embodiment of the present invention, the user selectable configuration for a computing system disposed in non-volatile storage and associated with the BIOS for the computing system can be mapped to sticky bits and accessed during power up, but before bootstrap. Thereafter, the configuration reflected by the sticky bits can be applied before bootstrap. Consequently, the user selectable configuration options can be applied to the computing system even prior to bootstrap and before the non-volatile storage associated with the BIOS becomes accessible.

Figure 1:
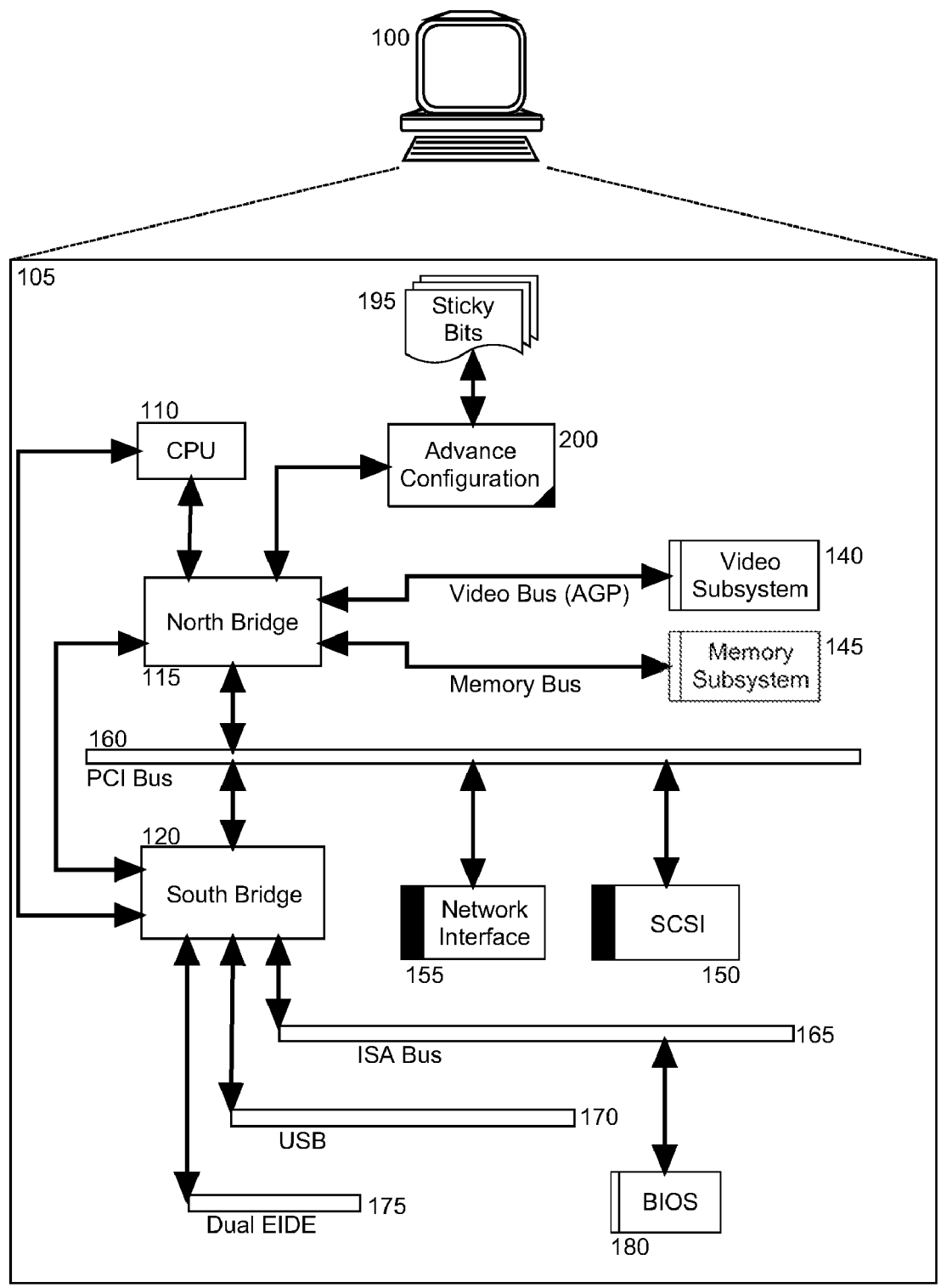
FIG. 1 is a schematic illustration of a motherboard configured for user selectable configuration options application for inaccessible nonvolatile storage at bootstrap; and, FIG. 2 is a flow chart illustrating a process for user selectable configuration options application for inaccessible nonvolatile storage at bootstrap.

In illustration, FIG. 1 is a schematic illustration of a motherboard configured for user selectable configuration options application for inaccessible nonvolatile storage at bootstrap. As shown in FIG. 1, a computing system 100 can include a motherboard 105 configured for user selectable configuration option application for inaccessible nonvolatile storage at bootstrap. The motherboard 105 can include a north bridge 115 and a south bridge 120, both coupled to a PCI bus 160 or other connective I/O fabric. The north bridge 115 can be a system controller managing a video subsystem 140 over a video bus, and a memory subsystem 145 over a memory bus. The north bridge 115 further can be coupled to a CPU 110.

The south bridge 120 also can be communicatively linked to the CPU 110. Additionally, the south bridge 120 can be coupled to a standard bus 165 such as an ISA bus, an I/O bus 170 such as a USB bus, and a mass storage bus 175 such as a dual enhanced integrated device electronics (EIDE) bus. The south bridge 120 can be a peripheral bus controller and can manage data flow from network interface devices 155 and peripheral devices 150 such as small computer systems interface (SCSI) devices on the PCI bus 160. Notably, a BIOS 180 can be accessed from over the standard bus 165 by the south bridge 120, but only once a communicative pathway has been established between the north bridge 115 and the south bridge 120. Consequently, user selectable configuration options in the BIOS 180 cannot be accessed from the BIOS 180 under the communicative pathway between the north bridge 115 and the south bridge 120 has been established.

In accordance with an embodiment of the present invention, advance configuration logic 200 can be coupled to the north bridge 115 and linked to sticky bits 195. The advance configuration logic 200 can include program code enabled on power up of the motherboard and before a communicative pathway is established with the south bridge 120 to load user configurable options from the sticky bits 195. The program code of the logic 200 further can be enabled to apply the loaded user configurable options to the configuration of the computing system 100. Finally, the program code of the advance logic 200 yet further can be enabled upon bootstrap once the communicative pathway has been established to compare user configurable options in the BIOS 180 with those of the sticky bits 195 to ensure a proper mapping. To the extent that the user configurable options in the sticky bits 195 differ from those of the BIOS 180, the sticky bits 195 can be updated with the data in the BIOS 180 and the motherboard 105 can be reset.

Figure 2:
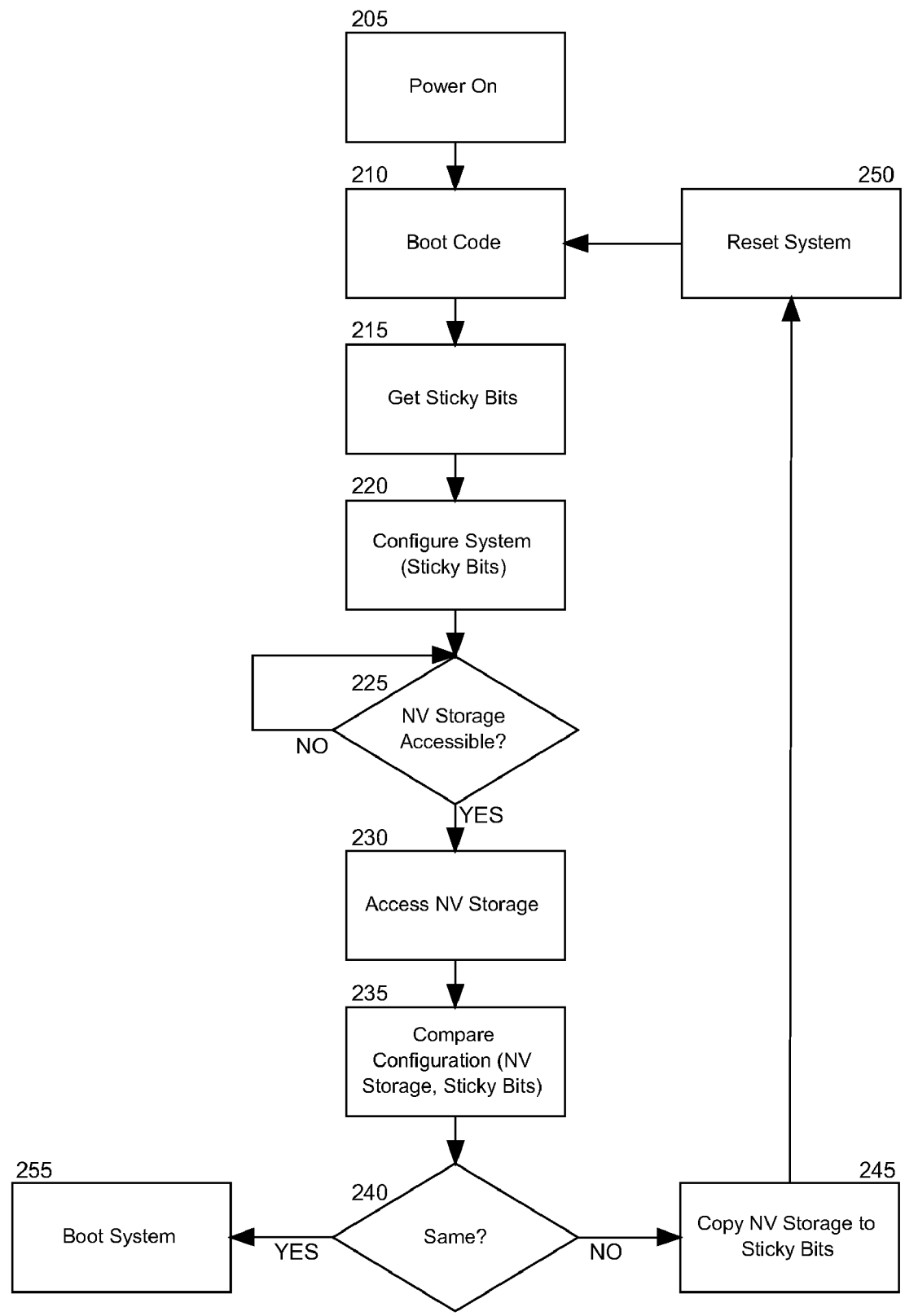

In further illustration, FIG. 2 is a flow chart illustrating a process for user selectable configuration options application for inaccessible nonvolatile storage at bootstrap. Beginning in block 205, the motherboard for the computing system can be powered on and in block 210 boot code can be loaded for the motherboard. In block 215, the sticky bits for configuring the computing system can be retrieved and the computing system can be configured with the settings reflected in the sticky bits in block 220. Thereafter, in decision block 225, it can be determined whether non-volatile storage associated with the BIOS for the motherboard has become accessible over a communicative pathway established for the north bridge and south bridge of the motherboard.

In decision block 225, if it is determined that non-volatile storage associated with the BIOS for the motherboard has become accessible over a communicative pathway established for the north bridge and south bridge of the motherboard, in block 230 the non-volatile storage can be accessed and the user configurable options for the computing system can be retrieved from the non-volatile storage. Subsequently, in block 235 the user configurable options retrieved from the non-volatile storage can be compared to the user configurable options reflected in the sticky bits. In decision block 240, if the user configurable options match, the computing system can proceed through bootstrap. Otherwise, in block 245 the user configurable options retrieved from non-volatile storage can be copied into the sticky bits and the computing system can be reset in block 250.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. In a motherboard for a computing system, a method for user selectable configuration options application for inaccessible nonvolatile storage at bootstrap, the method comprising:

powering up the motherboard;

reading user selectable configuration options for the computing system from sticky bits prior to bootstrap for the motherboard;

applying the user selectable configuration options to the computing system; and, performing bootstrap for the motherboard subsequent to applying the user selectable configuration options.

2. The method of claim 1, further comprising copying user selectable configuration options from non-volatile memory for a basic input output system (BIOS) for the motherboard into the sticky bits subsequent to bootstrap.

3. The method of claim 2, wherein copying user selectable configuration options from non-volatile memory for a BIOS for the motherboard into the sticky bits subsequent to bootstrap, comprises:

comparing the user selectable configuration options reflected by the sticky bits to the user selectable configuration options of the non-volatile memory; and, copying user selectable configuration options from the non-volatile memory into the sticky bits subsequent to bootstrap only if differences are detected between the user selectable configuration options.

4. The method of claim 3, further comprising resetting the motherboard responsive to detecting differences between the user selectable configuration options and subsequent to copying the user selectable configuration options from the non-volatile memory into the sticky bits.

5. A motherboard comprising:

a north bridge configured for coupling to a south bridge across a peripheral bus, each of the north bridge and south bridge being further configured for coupling to a central processing unit (CPU);

a basic input output system (BIOS) coupled to the south bridge, the BIOS being further coupled to non-volatile storage storing user selectable configuration options; and, advance configuration logic disposed in firmware coupled to each of the north bridge and sticky bits, the logic comprising program code enabled to apply to the motherboard prior to bootstrap user selectable configuration options reflected by the sticky bits in lieu of user selectable configuration options stored in the non-volatile storage.

6. The motherboard of claim 5, wherein the program code of the advance configuration logic is further enabled to copy user selectable configuration options from the non-volatile memory into the sticky bits subsequent to bootstrap of the motherboard only if differences are detected between the user selectable configuration options.

7. The motherboard of claim 5, wherein the peripheral bus is peripheral component interconnect (PCI) bus.

8. A computer program product comprising a computer usable medium embodying computer usable program code for user selectable configuration options application for inaccessible nonvolatile storage at bootstrap, the computer program product comprising:

computer usable program code for powering up a motherboard for a computing system;

computer usable program code for reading user selectable configuration options for the computing system from sticky bits prior to bootstrap for the motherboard;

computer usable program code for applying the user selectable configuration options to the computing system; and, computer usable program code for performing bootstrap for the motherboard subsequent to applying the user selectable configuration options.

9. The computer program product of claim 8, further comprising computer usable program code for copying user selectable configuration options from non-volatile memory for a basic input output system (BIOS) for the motherboard into the sticky bits subsequent to bootstrap.

10. The computer program product of claim 9, wherein the computer usable program code for copying user selectable configuration options from non-volatile memory for a BIOS for the motherboard into the sticky bits subsequent to bootstrap, comprises:

computer usable program code for comparing the user selectable configuration options reflected by the sticky bits to the user selectable configuration options of the non-volatile memory; and, computer usable program code for copying user selectable configuration options from the non-volatile memory into the sticky bits subsequent to bootstrap only if differences are detected between the user selectable configuration options.

11. The computer program product of claim 10, further comprising computer usable program code for resetting the motherboard responsive to detecting differences between the user selectable configuration options and subsequent to copying the user selectable configuration options from the non-volatile memory into the sticky bits.

* * * * *